United States Patent [19]
Duffy et al.

[11] Patent Number: 5,642,105
[45] Date of Patent: *Jun. 24, 1997

[54] BEARING WITH AN ARRANGEMENT FOR OBTAINING AN INDICATION OF THE TEMPERATURE WITHIN THE BEARING

[75] Inventors: Paul E. Duffy, Winsted; Richard W. Browner, Waterbury; Richard L. Lemoine, Harwinton; Mark I. Jurras, III, Canton Center, all of Conn.

[73] Assignee: The Torrington Company, Torrington, Conn.

[*] Notice: The term of this patent shall not extend beyond the expiration date of Pat. No. 5,602,539.

[21] Appl. No.: 518,087

[22] Filed: Aug. 22, 1995

[51] Int. Cl.$^6$ ................................................. G08C 19/12
[52] U.S. Cl. ........................ 340/870.17; 340/870.26; 340/870.3; 340/682; 384/448
[58] Field of Search ............... 340/870.16, 870.17, 340/870.26, 870.3, 682; 384/448; 367/135, 137

[56] References Cited

U.S. PATENT DOCUMENTS

| | | |
|---|---|---|
| 2,983,556 | 5/1961 | Coan . |
| 4,949,072 | 8/1990 | Comerford et al. ............... 340/870.16 |
| 5,125,845 | 6/1992 | Benktander et al. ............... 439/16 |
| 5,145,379 | 9/1992 | Benktander et al. ............... 439/34 |
| 5,446,452 | 8/1995 | Litton ............... 340/682 |

FOREIGN PATENT DOCUMENTS

WO-A-9413968  6/1994  WIPO .

Primary Examiner—Jeffery Hofsass
Assistant Examiner—Andrew Hill
Attorney, Agent, or Firm—John C. Bigler

[57] ABSTRACT

A temperature sensor is mounted on the inside surface of a stationary race around which a rotatable race rotates. Electric signals from the temperature sensor are converted into acoustic signals. Without the use of any hard wires, the acoustic signals are received by an acoustic-electric transducer mounted on the outside surface of the bearing housing. These electric signals from the acoustic-electric transducer are frequency demodulated and converted into signals which indicate on a display panel the temperatures within the bearing.

6 Claims, 2 Drawing Sheets

BEARING WITH AN ARRANGEMENT FOR OBTAINING AN INDICATION OF THE TEMPERATURE WITHIN THE BEARING

BACKGROUND OF THE INVENTION

This invention relates to bearings. More particularly, this invention is a combination of elements including a temperature sensor to monitor temperature conditions within the bearing, an electric-acoustic transducer to convert signals representing the temperature into acoustic waves and an acoustic-electric transducer to receive the acoustic waves and convert the acoustic waves into electric signals and an electronic system for displaying information representing the temperatures inside the bearing.

There are numerous bearing applications where the bearing is mounted in a housing that denies access to the bearing by servicing personnel. For example, one characteristic which indicates how the bearing is performing is the temperature characteristics within the bearing. The temperature characteristics are best measured from inside the bearing. Temperature-measurement sensors are more responsive the closer they are to the source of heat generation. A more reliable measurement is obtained if the temperature sensor is permanently mounted within the bearing eliminating installation differences and misapplication of the temperature sensor.

Furthermore, in applications where the bearing is transferred to a number of different locations during its life, the ability to maintain the historical data pertaining to an individual bearing is of great advantage in diagnosing bearing conditions.

While better measurements are obtained from within the bearing, the information must be made available to the personnel responsible for servicing the bearing for this information to be useful in diagnosing problems occurring in the bearing and surrounding equipment. Therefore, only if a system can be devised which can relay temperature information out of the bearing will a measurement taken inside the bearing be of value.

Currently known systems for indicating the temperature inside a bearing require that the transfer of information from within the bearing are obtained by hard-wired electrical connections. That is, wires are required which are connected to a transducer used as a receiver of information, then the wires lead through holes in the housing in which the bearing is mounted and finally the wires lead to a receiving transducer outside the housing where the signals are treated electronically for display. This is unwieldy in temperature applications where the bearings are very large and are removed and returned to service frequently, such as, in steel rolling mills. For these applications, clearly a system which transfers information such as temperature from within the bearing to outside the housing in which the bearing is mounted without the use of wires for the transfer is of great value. This invention provides such a system. No hard wires are used for transmitting temperature information from the bearing within the housing to a receiver located on the outside of housing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an annular rotatable race mounted within a housing. An annular stationary race is mounted in the housing and has a greater inside diameter than the outside diameter of the annular rotatable race. A plurality of rollers is located in the annular space between the races. At least one temperature sensor is located on the inside surface of the annular stationary race. An electric-acoustic transducer is located on the annular stationary race. The electric-acoustic transducer is adapted to transmit acoustic signals through the housing. These signals represent the temperature within the bearing. An electronic system interconnects the temperature sensor and the electric-acoustic transducer. At least one acoustic-electric transducer is mounted on the outside surface of the housing. This acoustic-electric transducer receives the signals transmitted by the electric-acoustic transducer and converts these acoustic signals into electric signals representing the temperatures within the bearing. An electronic system is connected to the acoustic-electric transducer for indicating the temperatures within the bearing.

The foregoing and other aspects will become apparent from the following detailed description of the invention when considered in conjunction with the accompanying drawing figures.

BRIEF DESCRIPTION OF THE DRAWING FIGURES

FIG. 1 is a perspective view of a large bearing such as the large bearing used in steel mills with portions of the housing removed and portions of the inner race of the bearing removed in order to better illustrate the invention; and FIG. 2 is an electrical block diagram illustrating one preferred embodiment of the invention.

DETAILED DESCRIPTION

In the various figures, like parts are referred to by like numbers.

Figure 1:
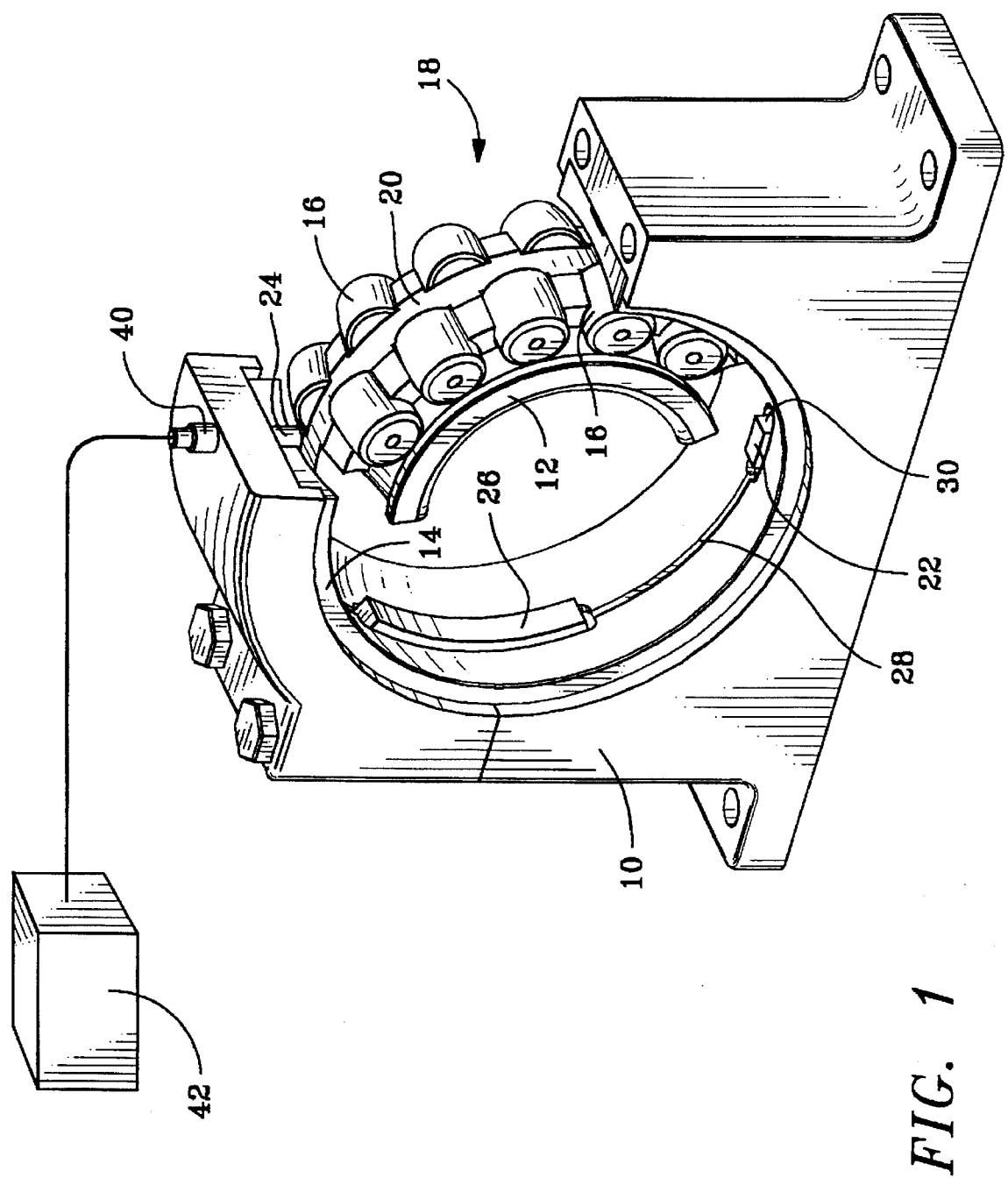

Referring to the drawings, and more particularly to FIG. 1, a housing 10 of the type used for supporting large bearings such as those used in steel mills is shown. A rotatable member 12 is rotatably mounted within the housing 10. As shown in FIG. 1, the rotatable member 12 is a rotatable race; however, it is to be understood that under some circumstances and with some bearings, rather than having a rotatable race, a rotatable shaft could extend entirely through the bore in the housing 10 and the shaft serve as a race. A portion of the annular rotatable race 12 is not shown in FIG. 1 so that the inventive features can be more clearly shown.

An annular stationary race 14 is also mounted within the housing 10. The race 14 has a greater inside diameter than the outside diameter of the race 12. A plurality of rollers 16 are located in the annular space between the race 12 and the race 14.

The rollers 16 are mounted within the roller pockets of the roller cage 18. The annular ring 20 of the annular cage 18 separates the rollers 16 into two axially spaced series of rollers.

A temperature sensor 22 is located on the inside surface of the stationary annular race 14. In a preferred embodiment, the temperature sensor is an integrated circuit sensor. This is an active silicon device with a known and repeatable relationship between the temperature of the device and its output voltage.

In the drawings, one temperature sensor is shown. However, the actual number of temperature sensors is dependent on how much resolution is wanted and also on the size and length of the bearing and area to be sensed by the temperature sensor. However, of course, at least one sensor must be used.

An electric-acoustic transducer 24 is located in the annular stationary race 14. The electric-acoustic transducer 24 is adapted to transmit acoustic signals through the housing 10. The acoustic signals are related to the temperatures within the bearing. The electric-acoustic transducer may, for example, be a transducer using a piezoelectric effect. They contain piezoelectric crystals. The electric-acoustic transducer 24 converts electrical energy into acoustic energy.

The electronic system 26 interconnects the temperature sensor 22 and the electric-acoustic transducer 24. In the embodiment shown in FIG. 1, a groove 28 extends partially around the inside surface of the stationary annular race 14. However, if desired, the groove may extend around the entire inside surface of the stationary annular race 14 for lower manufacturing costs. That part of the groove which extends from the electronic system 26 to the electric-acoustic transducer 24 is not shown in FIG. 1 because it is hidden by the stationary race 14. The temperature sensor 22 is located in the pocket 30 in the inside surface of the stationary annular race 14. Wires extend along the groove 28 from the temperature sensor 22 to the electronic system 26. Wires also extend from the electronic system 26 to the electric-acoustic transducer 24.

Figure 2:
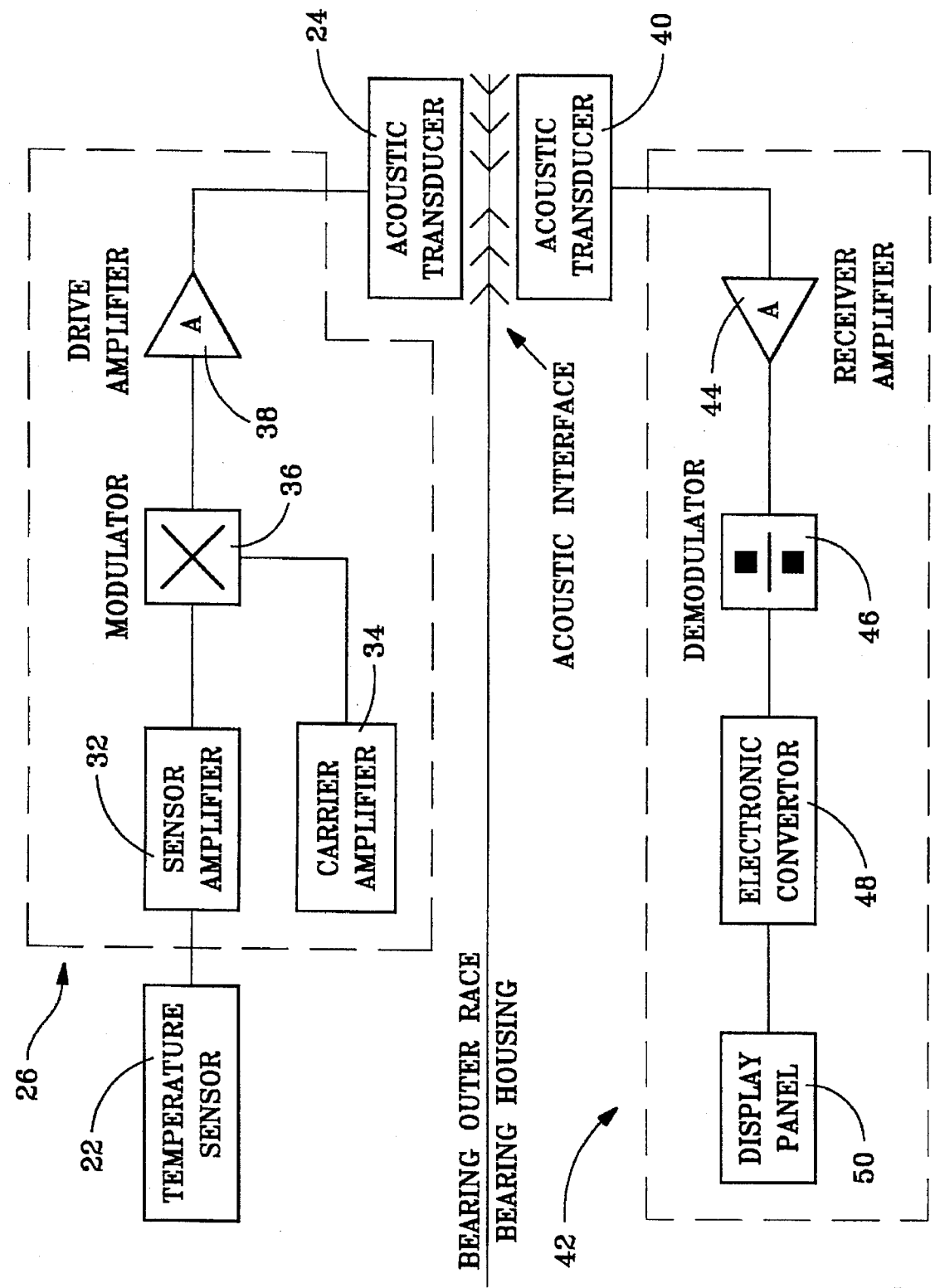

Referring to FIG. 2, the electronic system 26 interconnecting the temperature sensor 22 and the electric-acoustic transducer 24 includes a sensor amplifier 32, a carrier amplifier 34, a frequency modulator 36, and a drive amplifier 38. The frequency of the transmitted signal from the frequency modulator 36 varies in proportion to the temperature level being transmitted. In this way, the amplitude of the transmitted pulses need not be controlled, and the signal will not be disturbed by changes in signal strength and noise present in the bearing at the transmission carrier frequency.

Referring to FIG. 1, an acoustic-electric transducer 40 is mounted on the outside surface of the housing 10. In the embodiment shown the acoustic-electric transducer 40 is in-line with and radially spaced from the electric-acoustic transducer 24. Thus, the acoustic waves from the electric-acoustic transducer 24 are directly fed to the acoustic-electric transducer 40.

The acoustic-electric transducer 40 is adapted to receive the acoustic signals transmitted by the electric-acoustic transducer 24 and convert these acoustic signals into electric signals related to the temperature within the bearing.

The signals from the acoustic-electric transducer 40 are fed to the electronic system 42. Referring to FIG. 2, the electronic system 42 has included therein a receiver amplifier 44, a frequency demodulator 46, an electronic converter 48, and a display panel 50. The electronic converter 48 converts the output from the frequency demodulator 46 into a value that will indicate the temperatures within the bearing. This indication is displayed on the display panel 50.

Having described the invention, what is claimed is:

1. In combination:

a housing;

an annular rotatable race within said housing;

an annular stationary race mounted in the housing having a greater inside diameter than the outside diameter of the annular rotatable race;

a plurality of rollers located in the annular space between said races;

at least one temperature sensor located on the inside surface of the annular stationary race;

an electric-acoustic transducer located on the annular stationary race, said electric-acoustic transducer being adapted to transmit acoustic signals through said housing related to the temperatures within the annular stationary race;

an electronic system interconnecting said temperature sensor and said electric-acoustic transducer;

at least one acoustic-electric transducer mounted on the outside surface of said housing, said acoustic-electric transducer being adapted to receive the acoustic signals transmitted by said electric-acoustic transducer and convert said acoustic signals into electric signals related to the temperatures within the annular stationary race; and an electronic system connected to the acoustic-electric transducer for indicating the temperatures within the annular stationary race.

2. The combination of claim 1 wherein the temperature sensor is an active silicon device.

3. The combination of claim 2 wherein the electric-acoustic transducer and the acoustic-electric transducer contain piezoelectric crystals.

4. The combination of claim 3 wherein the electronic system interconnecting said temperature sensor and said electric-acoustic transducer has a frequency-modulator, the frequency of the transmitted signal varying in proportion to the temperature level.

5. The combination of claim 4 wherein the electronic system connected to the acoustic-electric transducer for indicating the temperatures within the annular stationary race has a frequency demodulator, an electronic converter for converting the output from the demodulator into a value that will indicate the temperatures within the annular stationary race; and a display panel.

6. The combination of claim 1 wherein the annular stationary race includes a recess and the electric-acoustic transducer mounted on the annular stationary race is mounted in the recess.

* * * * *